United States Patent [19]
Taylor

[11] 3,780,440
[45] Dec. 25, 1973

[54] MEASURING INSTRUMENT

[75] Inventor: James L. Taylor, Laverne, Calif.

[73] Assignee: Ideal Aerosmith, Inc., Cheyenne, Wyo.

[22] Filed: July 21, 1971

[21] Appl. No.: 164,925

Related U.S. Application Data

[63] Continuation of Ser. No. 841,654, May 7, 1969, abandoned, which is a continuation-in-part of Ser. No. 669,346, Sept. 5, 1967, abandoned, which is a continuation-in-part of Ser. No. 574,622, Aug. 24, 1966, abandoned.

[52] U.S. Cl. .................................................. 33/139
[51] Int. Cl. ........................... G01b 3/12, G01b 5/02
[58] Field of Search ..................... 33/138, 139, 140, 33/141, 125 T, 126.5, 126.6

[56] References Cited
UNITED STATES PATENTS

| | | | |
|---|---|---|---|
| 2,706,336 | 4/1955 | Gruber | 33/139 |
| 3,271,564 | 9/1966 | Rosenfeld et al. | 235/151.35 |
| 3,466,050 | 9/1969 | Sindlinger | 274/1 A |
| 3,058,001 | 10/1962 | Dertouzos | 250/233 |
| 2,553,613 | 5/1951 | True | 33/139 |
| 1,981,196 | 11/1934 | Riblet | 64/17 |

Primary Examiner—Louis R. Prince
Assistant Examiner—Steven L. Stephan
Attorney—Reilly and Lewis

[57] ABSTRACT

An electronic measuring instrument is provided which includes an encoder having a control shaft and which generates electrical signals representative of angular increments of the control shaft and of the direction of rotation thereof, an extensible member with respect to the encoder housing is mechanically coupled to the control shaft and turns the control shaft in one direction or the other as the extensible member is moved in and out of the housing to measure linear distances, and a bidirectional electronic counter and display unit is electrically coupled to the encoder and responds to the electrical signals from the encoder to provide an exact reading of the corresponding linear distances measured by the extensible member as it is moved in and out of the housing.

The extensible member, for example, may be a steel flexible tape which is stored within the housing of the encoder unit on a supply drum, and which is drawn around a wheel coupled to the aforesaid control shaft to turn the wheel and control shaft in one direction or the other as the tape is moved in and out of the encoder housing. Appropriate tensioning means, such as a "Negator" spring, may be provided within the encoder housing to draw the tape in and around the aforesaid drum. However, other linear distance measuring means may be used to turn the aforesaid control shaft, such as a flexible cord, a rigid rod, a rack and pinion arrangement. Moreover, other means may be used to bias the tape, cord, or other distance measuring means into the encoder housing, such as an external weight, a torque motor, or the like.

7 Claims, 15 Drawing Figures

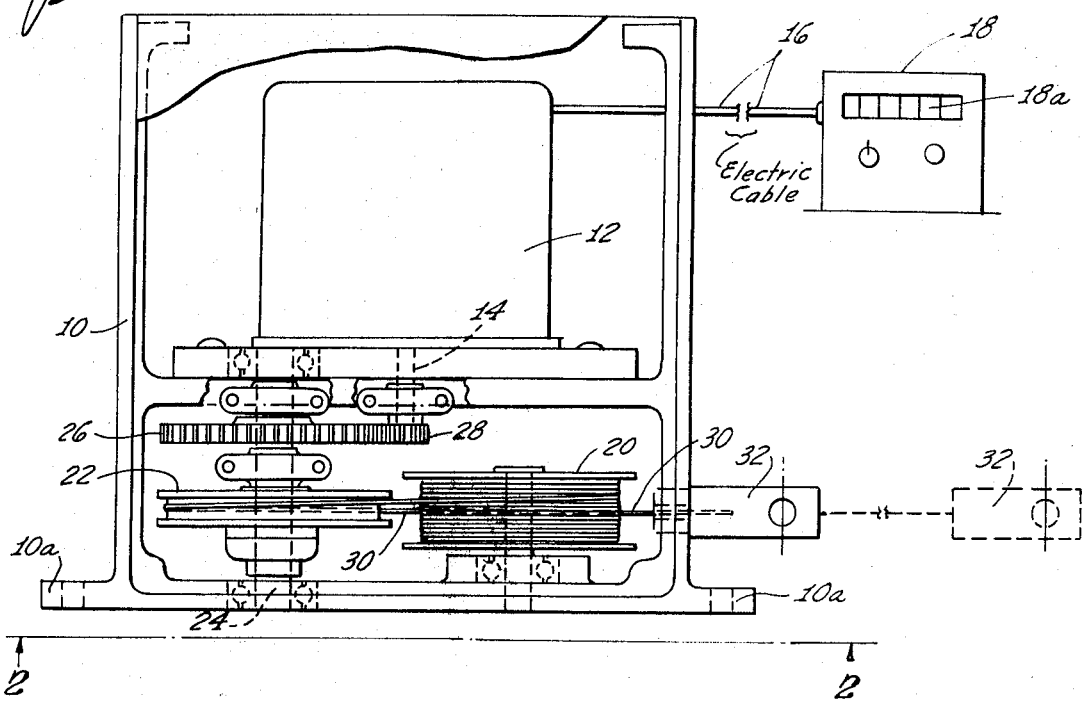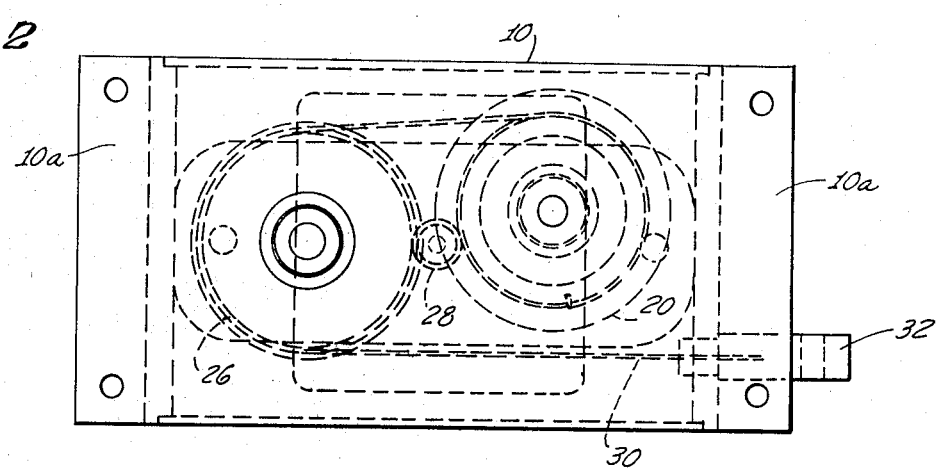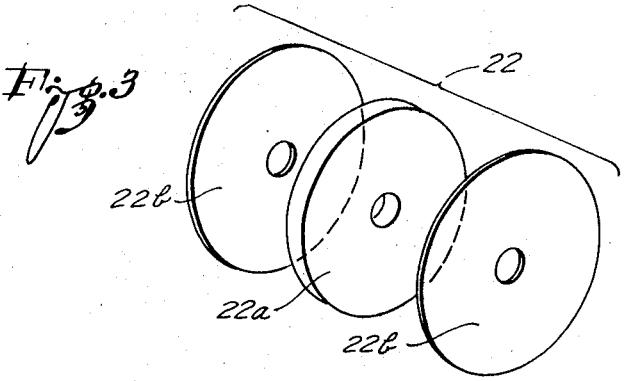

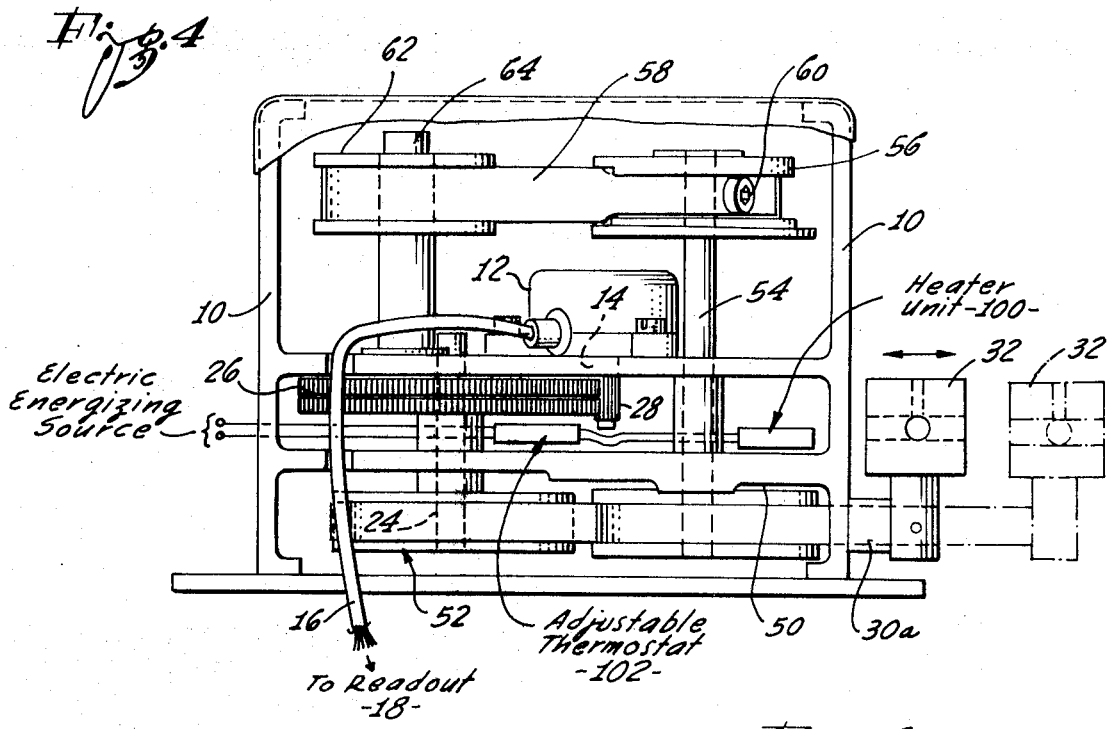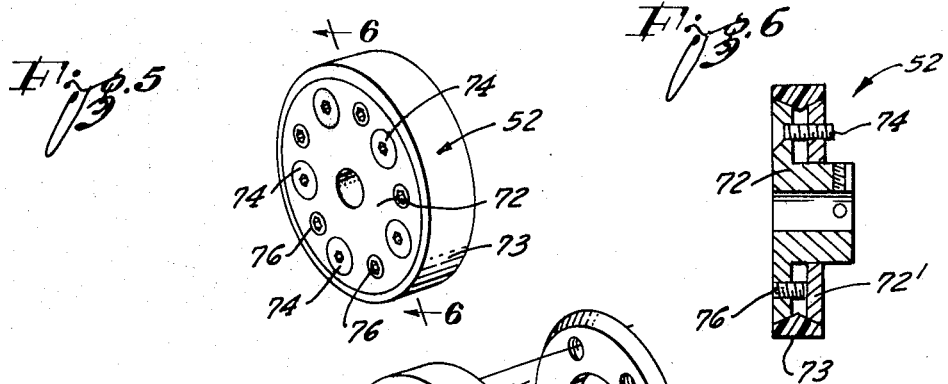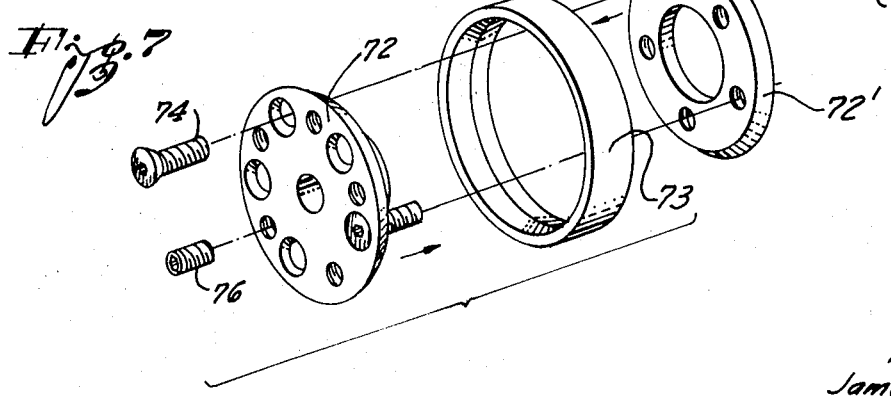

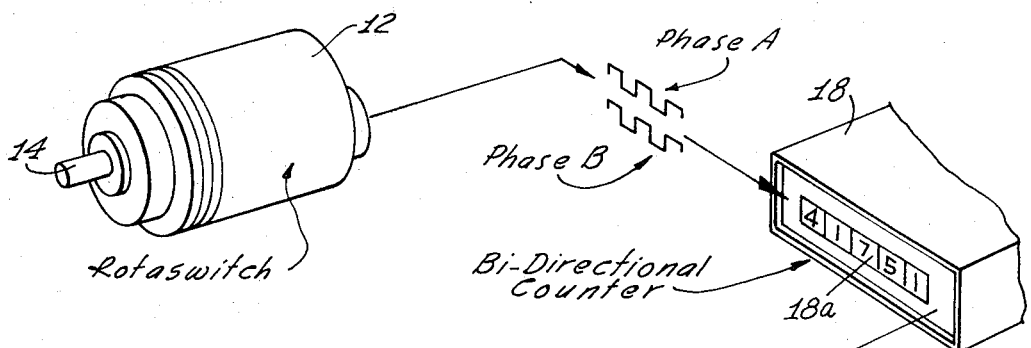
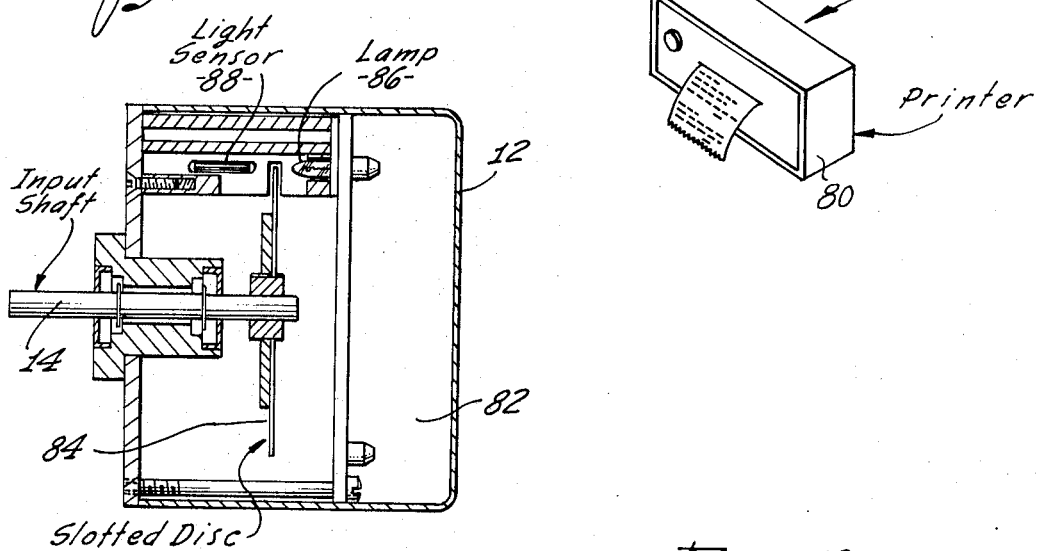
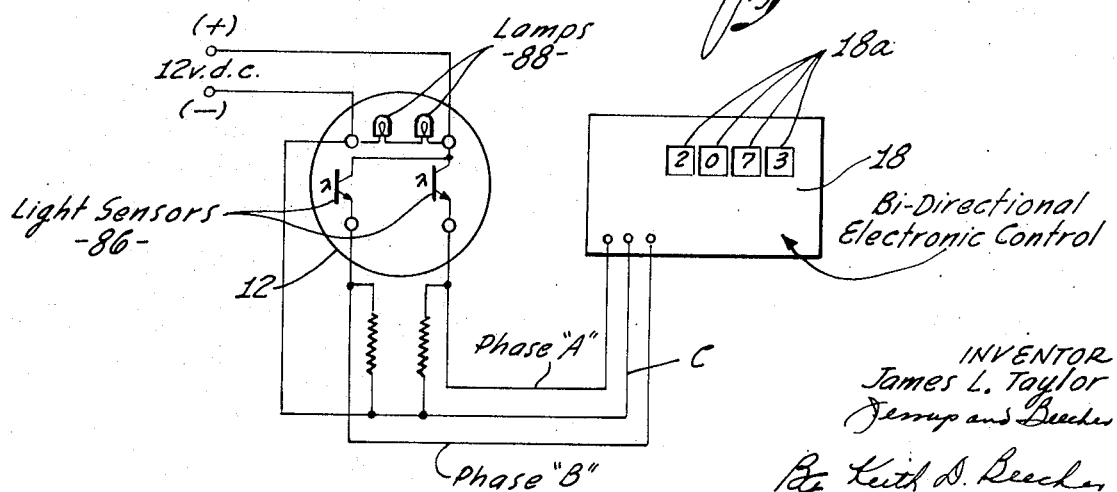

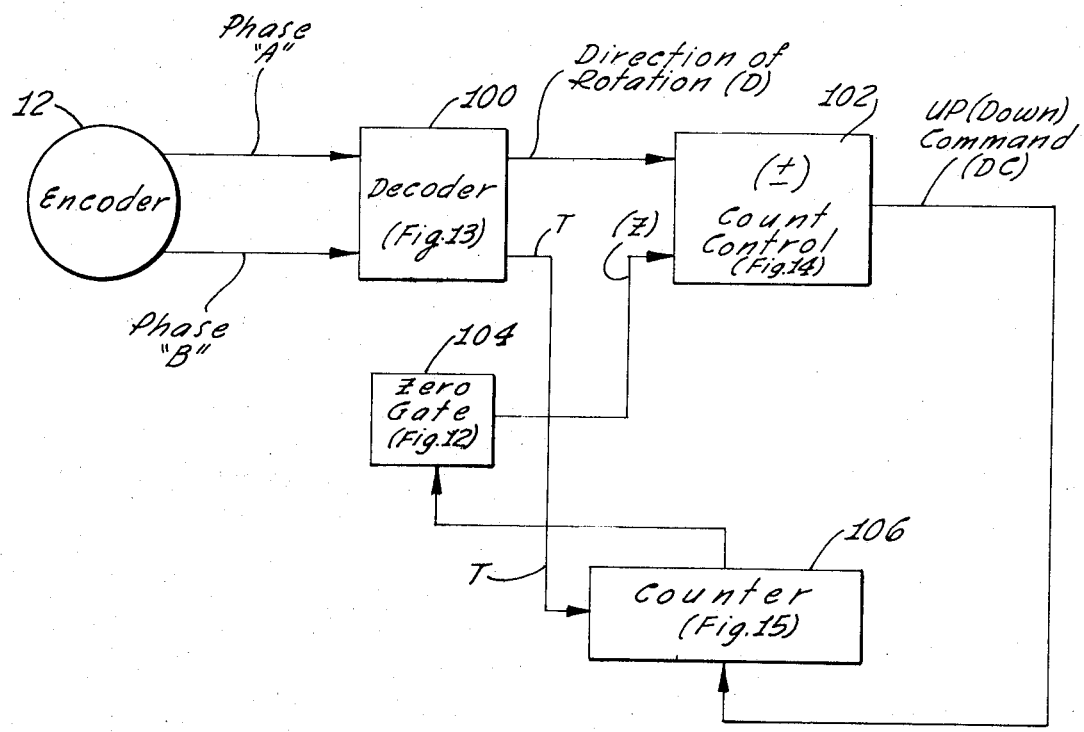
Fig. 11 (Bi-Directional Electronic Counter and Display Unit)
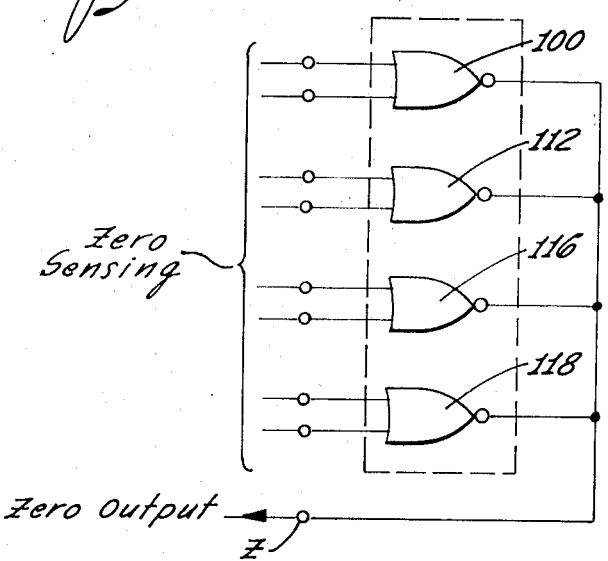
Fig. 12 (Zero Gate-104)

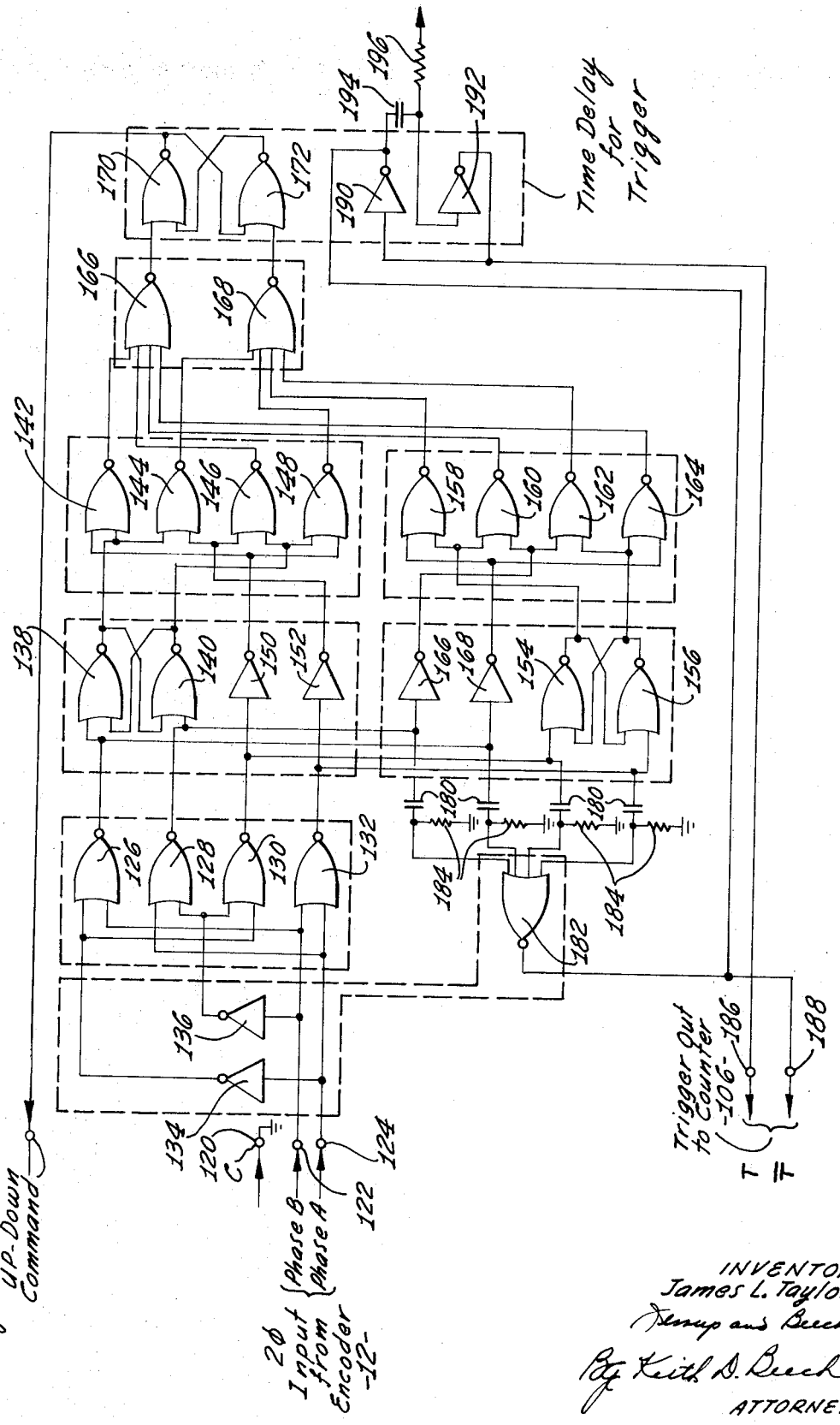

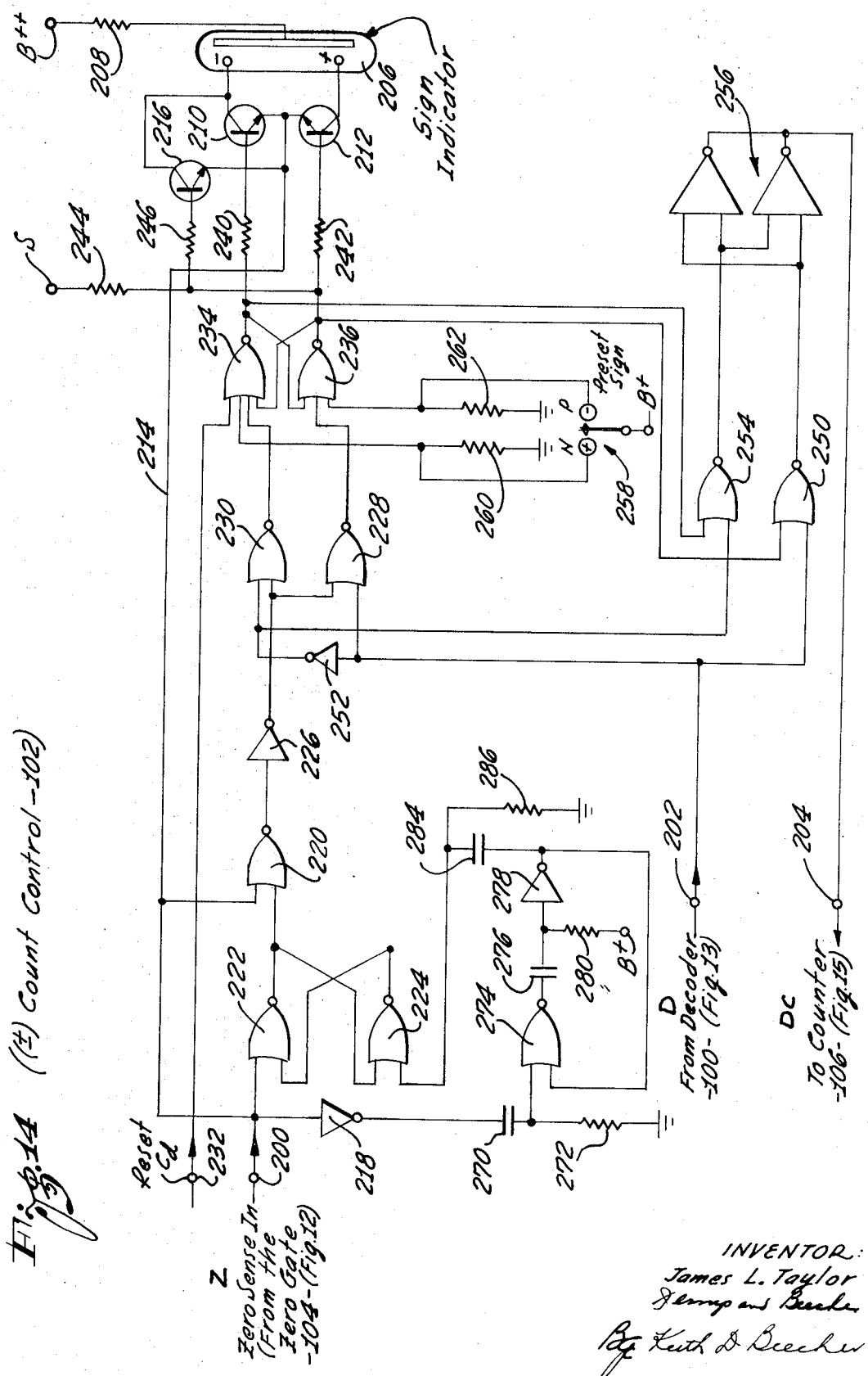

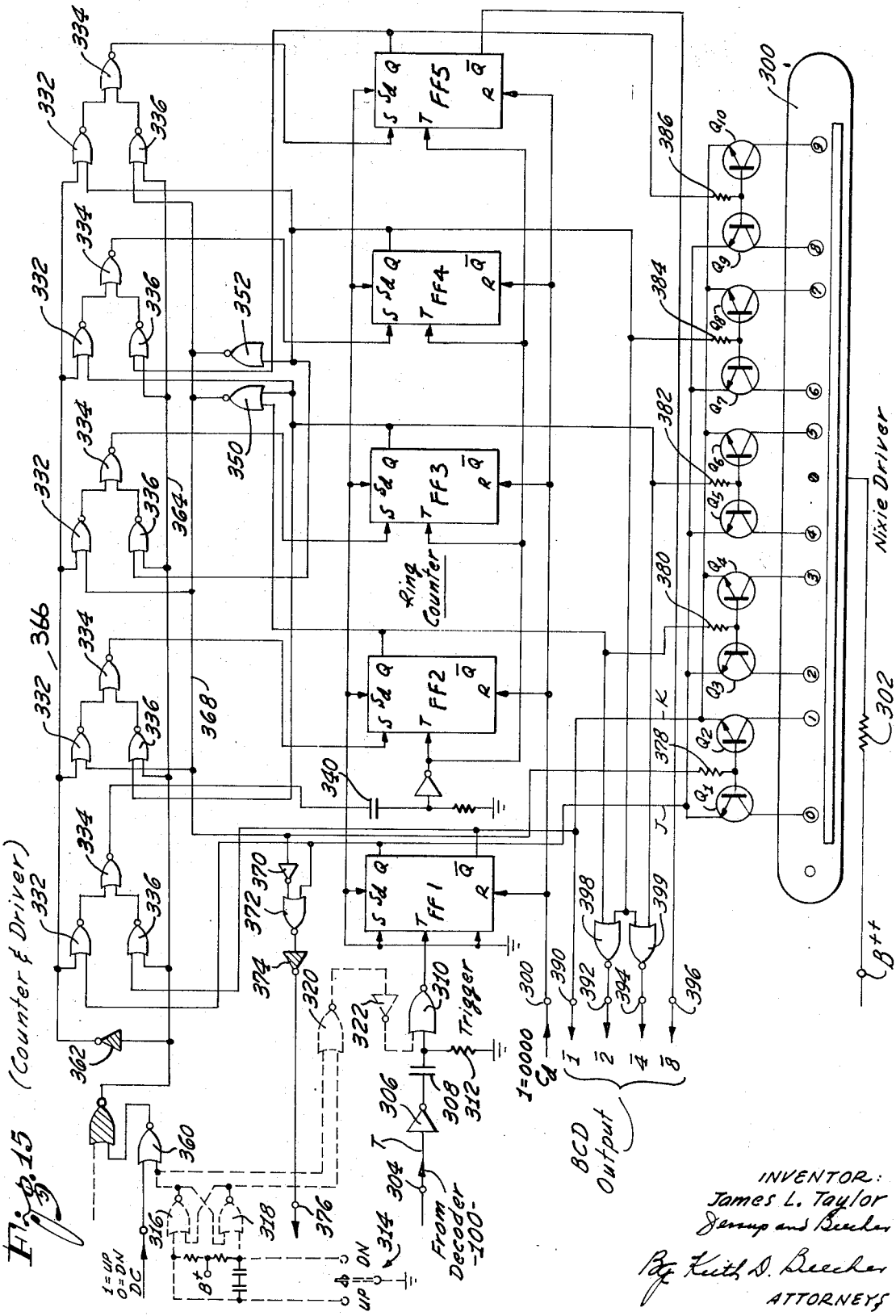

MEASURING INSTRUMENT

The present application is a continuation of copending application Ser. No. 841,654 filed May 7, 1969; which was a continuation-in-part of application Ser. No. 669,346 filed Sept. 5, 1967; which was a continuation-in-part of application Ser. No. 574,622 filed Aug. 24, 1966. All of the above applications are now abandoned.

BACKGROUND OF THE INVENTION

The instrument of the present invention finds wide utility wherever precise linear measurements are to be made. For example, the instrument may be mounted directly on lathes, milling machines, and the like, for enabling production measurements to be quickly, conveniently, and instantly made while the workpiece is being processed.

As mentioned above, the instrument of the invention is controlled by an extensible member, which may be a flexible steel tape, or the like, and it serves to convert movements of the extensible member into precisely interpolated rotary movement of a control shaft. The resulting rotary movement of the control shaft is transmitted to an encoder which, as will be described, produces electrical signals indicative of the total number of angular increments through which the control shaft is turned, as well as the direction of rotation of the control shaft.

The resulting electrical signals from the encoder are used to control a bidirectional counter in an electronic read-out device, so that readings corresponding to the linear movements of the extensible member in or out of the encoder housing may be instantly displayed. The readings may be displayed, for example, by means of a "Nixie" tube or other appropriate display device; "Nixie" being a registered trademark of the Burroughs Corporation. Moreover, the readings of the display unit may be transmitted to a printer, or similar recording mechanism; or they may be used to perform a control function on a machine. For example, the readings may be used to actuate switches at points predetermined by numerical tapes, punched cards, or the like, to stop and start the movable table of a machine for inspection or manufacturing purposes.

A feature of the improved electronic measuring instrument of the present invention is that the display device may be controlled to display the linear distances measured by the extensible member as it is moved in and out of the encoder housing on any desired scale, and in accordance with any desired decimal, metric, or other system. The conversion factor between the linear distances represented by the movements of the extensible member and the displayed reading on the display device may be established by selecting an appropriate and predetermined diameter for the aforesaid wheel around which, for example, the flexible tape forming the extensible member is wrapped so that its movements may be converted to rotary movements of the aforesaid control shaft in accordance with a predetermined scale factor.

The electronic measuring instrument of the present invention is small in size and light in weight. As mentioned above, it is controlled, for example, by an elongated extensible control member, such as a tape, cord or rod, which is moved in and out of the housing of the encoder, as it is used to measure linear distances. As the control member is moved in and out of the encoder housing, a mechanical linkage transmits the exact position of the control member to the encoder, causing it to generate a corresponding number of electric pulses which indicate not only the exact position of the remote end of the extensible member with respect to the encoder, but also indicate the direction in which the extensible member is being moved with respect to a reference position established by a preset zero on the display device.

The instrument of the invention is advantageous in that it has a simple and sturdy construction, so as to be trouble-free, and capable of maintaining its calibration indefinitely over a wide range of temperature and environmental variables. In addition to being light in weight, and relatively simple in its construction, the electronic instrument of the invention is easy to install and simple to operate. The instrument is particularly adaptable to direct digital read-out techniques and resolutions down to 50 millionths (0.00005) of an inch are possible. The applicability of the instrument of the invention is almost universal, and as mentioned above, it may be used in conjunction, for example, with mills, lathes, sheet metal punches, lay-out tables, coordinate measuring machines, height gages, shears and the like.

An object of the invention, therefore, is to provide an improved electronic measuring instrument having general utility for the precise measurement of linear distances, and which has the capability of referencing the aforesaid distances to any selected zero position, and of providing a sign indication of the position of such distances on either side of the preset zero position.

Another object is to provide such an improved electronic measuring instrument which is particularly adapted to be mounted directly on a machine tool to facilitate the operations on the work being processed by the tool. However, as mentioned above, the instrument of the invention has general utility wherever rapid and precise measurements of linear distances are required.

Another object of the invention, as previously stated, is to provide an improved measuring instrument which, although extremely precise and accurate in its operation, is relatively simple and inexpensive in its construction, easy to install and simple to operate.

SUMMARY OF THE INVENTION

The invention provides an electronic linear measuring instrument which includes a control shaft mounted in a housing for rotation about a particular axis and coupled to an electrical encoder, the encoder generating electrical signals indicative of the direction of rotation of the aforesaid control shaft and the total number of angular increments turned by the shaft for any particular operation. An elongated control member in the form, for example, of a rod, flexible tape or cord, is moved in and out of the encoder housing, and when so moved produces rotational movement of the control shaft corresponding precisely to the linear distances measured by the control member as it is moved in and out of the encoder housing. The resulting rotary movement of the control shaft is converted into electrical signals by the encoder which are applied to an electronic bidirectional counter and read-out device, so that readings corresponding precisely to the movements of the extensible member may be instantaneously displayed on any desired scale, and with reference to any desired zero reading.

BRIEF DESCRIPTION OF THE DRAWINGS

FIG. 1 is a side elevation of a measuring instrument constructed to embody the concepts of one embodiment of the invention, with the housing partly broken away to reveal the internal components of the instrument;

FIG. 2 is a plan view of a portion of the instrument of FIG. 1, taken essentially along the line 2—2 of FIG. 1;

FIG. 3 is an exploded perspective view of one of the elements making up the instrument shown in FIGS. 1 and 2;

FIG. 4 is a side elevation of a second embodiment of one of the units making up the measuring instrument of FIG. 1, with the housing of the unit being broken away to reveal the internal components thereof;

FIG. 5 is a perspective view of a rotatably mounted wheel assembly which is included in the embodiment of FIG. 4;

FIG. 6 is a section of the wheel assembly of FIG. 5, taken substantially along the line 6—6 of FIG. 5;

FIG. 7 is an exploded view of the wheel assembly of FIG. 5, showing the various components which make up the assembly;

FIG. 8 is a schematic representation of certain components which may be incorporated into the improved electronic measuring instrument of the invention;

FIG. 9 is a sectional view of an encoder which may be used in the measuring instrument of the invention;

FIG. 10 is an electric diagram illustrating how the encoder of FIG. 9 may be electrically connected to the bidirectional counter and display device in the combination of the present invention;

FIG. 11 is a block diagram illustrating various components which may be used to comprise a suitable bidirectional counter and display unit for use in the measuring system of the invention, the resulting counter and display unit being shown as coupled to the encoder, as in FIG. 10; and FIGS. 12, 13, 14 and 15 are logic diagrams of the respective components shown in block form in FIG. 11.

DETAILED DESCRIPTION OF THE ILLUSTRATED EMBODIMENTS

The embodiment of the invention illustrated in FIGS. 1-3 includes, for example, a casing or housing 10. The housing 10 includes flanges 10a which permits it to be mounted, for example, on a machine tool, or the like, for the purposes explained above. The housing 10 supports an electronic encoder unit 12. This unit, for example, may be of known construction, and it generates electrical signals corresponding to the angular increments turned by a control shaft coupled to the encoder, and which also indicate the direction of rotation of the control shaft. The number of angular increments designated by the electrical signals for each revolution of the control shaft depends upon the resolution of the encoder.

The encoder 12, for example, may be of the type presently marketed by Disc Instruments, Inc. of Santa Ana, Calif., and sold by them under their registered trademark "Rotoswitch." For example, the electrical signals generated by the encoder 12 may be a pair of pulse signals which are in phase quadrature with one another, and which are both used to sense the direction of rotation of the control shaft of the sensor. The pulses of each pulse signal are a measure of the number of rotations of the control shaft 14, for example, multiplied by the resolution of the encoder. The resolution of the usual encoder marketed under the trademark "Rotoswitch" is such that the encoder generates, for example, a number of pulses per revolution of the control shaft as determined by the resolution of the encoder.

The pulse signals derived from the encoder 12 are carried by an appropriate cable 16 to a bidirectional counter and display unit 18. The unit 18 includes, for example, a "Nixie" display 18a, or the like, and the bidirectional counter in the unit responds to the pulse signals from the encoder to provide readings and sign designations correlated exactly to the linear distances measured by the instrument.

The bidirectional counter and display unit 18 may be of any type known to the art and which, for example, includes controls by which the counter may be set to zero for any reference extended position of the elongated extensible control member, and which provides a positive increasing count when the control member is moved in a first linear direction away from the reference position, a decreasing positive count when the control member is then moved along the linear path back towards the reference position, an increasing negative count when the control member is moved in a first linear direction away from the reference position on the other side of the reference position, and a decreasing negative count when the control member is moved towards the reference position on the other side thereof.

Although bidirectional counter and display units capable of achieving the aforesaid functions are known to the art, an improved counter and display will be set forth in detail herein, as indicative of one possible bidirectional counter and display unit which may be used in the combination of the invention.

A spring loaded reel 20 and a wheel 22 are also supported in the encoder housing 10 in the embodiment of FIGS. 1 and 2. The wheel 22 is mounted on a shaft 24, and a gear 26 is also mounted on the shaft. The gear 26 is coupled to a gear 28, the latter gear being keyed to the encoder control shaft 14.

The elongated control member in the embodiment of FIGS. 1 and 2 is in the form of a flexible cord 30 which is wrapped around the wheel 22, and which is coiled and stored on the reel 20 which, as mentioned above, may be spring loaded by any appropriate means. A coupler 32 is attached to the end of the cord 30, so that the cord may be coupled to any appropriate member, and moved by the member out of the encoder housing 10, and retracted by the spring loaded reel 20 into the encoder housing 10, as the member moves along a path on either side of a reference position, so as to enable the instrument of the invention to monitor and measure the linear displacements of the member.

To use the instrument shown in FIGS. 1 and 2, the encoder housing 10 is fastened to the base of a machine, for example, and the coupler 32 is fastened to the movable slide or table of the machine. Then, as the slide or table of the machine moves away from or towards the encoder housing 10, the cord 30 is drawn out of or retracted into the housing and the wheel 22 is rotated back and forth by amounts corresponding to the movements of the moving slide or table, towards and away from the encoder housing. The resulting rotation of the wheel 22 is transmitted through the gears 26 and 28 to the control shaft 14 of the encoder 12, causing the encoder to generate the aforesaid electric signals which control the bidirectional counter and display unit 18 so that the exact linear distances through which the coupler was moved by the slide or table may be displayed.

As will be described, the bidirectional counter 18 may be preset so that its zero reading corresponds to any desired reference position of the coupler 32 with respect to the encoder housing. Then, as the table or slide of the machine first moves away from the encoder housing towards the reference position, the count displayed by the display 18a will decrease until the zero or reference position is reached. Then, subsequent movement of the slide or table of the machine away from the encoder housing will cause the sign to change and the count to increase.

The reel 20, as mentioned above, serves as a return means and storage for the extensible cord 30, so that when the slide or table of the machine moves in the opposite direction, the extensible member 30 moves back into the encoder housing 10, and the encoder 12 is rotated in the opposite direction, so that the bidirectional counter 18 and display 18a is also reversed, with a corresponding sign change indicated by the display. During the latter operation, the count displayed by the display 18a will decrease as the slide or table moves back towards the zero or reference position, and will then increase as the slide or table continues movement beyond the zero or reference position.

As mentioned above, other means may be used to return the extensible member 30 to the encoder housing. For example, the spring loaded reel 20 may be replaced by a torque motor, or the extensible member may continue directly through the encoder housing, with an appropriate weight, or other means, being used to return it, when the slide or table of the machine moves in a direction towards the encoder housing.

It is essential, of course, that the wheel 22 accurately converts the linear movements of the extensible member 32 into exactly related rotary movements of the control shaft 14. For that reason, it is essential that the wheel 22 have an accurately determined radius so that the proper conversion factor may be achieved, and that it be precisely round and precisely concentric with respect to its axis of rotation of the shaft 24. In order to achieve the aforesaid requirements of the wheel 22, and in accordance with the teaching of the embodiment of the invention shown in FIGS. 1–3, the wheel 22 is made of three separate parts, as shown in FIG. 3.

That is, the wheel 22 includes a central element 22a formed of a critically machined part, and which is ground and lapped until it is exactly round and exactly concentric with its central aperture. By present day techniques, this exactness may be achieved to within 0.02 mils, for example. The wheel 22 also includes a pair of side discs 22b which serve merely to retain the extensible member 30 on the periphery of the central element 22a, and the dimensions of the side discs are not critical. The elements 22a and 22b are then mounted in a press-fit relationship on the shaft 24, and they may be held together as an assembled unit by an appropriate fastener means.

The construction of the wheel 22 shown in FIG. 3 and described above permits the wheel to be fabricated to the desired exact tolerances, so as to be truly round and truly concentric, this being achieved without the need for special tools or excessively difficult operations. It will be appreciated that even increased accuracy may be achieved by mounting the wheel 22 directly on the control shaft 14. However, this is not necessary for most purposes, since extremely accurate relationships between the gears 26 and 28 may be achieved by present day techniques and practices.

In the embodiment of FIGS. 4–7, the cord 30 of the previous embodiment is replaced by a flexible resilient steel tape 30a. The components shown in the embodiment of FIGS. 4–7 which are similar to those of the embodiment of FIGS. 1 and 2 are designated by the same numbers. The flexible steel tape 30a is stored in coiled form on a supply reel 50, corresponding to the spring-loaded reel 20 of the previous embodiment. The tape 30a is then looped around a wheel 52 which corresponds to the wheel 22 of the previous embodiment.

The wheel 52 is mounted on the shaft 24, so that rotation of the wheel 52 drives the gear 26, as in the previous embodiment. The reel 50, on the other hand, is mounted on a shaft 54 which extends to the other side of the housing to support a further reel 56. A resilient "Negator" spring 58 is attached to the reel 56 by means, for example, of a set screw 60, and the "Negator" spring also extends around a further reel 62 which is rotatably mounted on a shaft 64, and which is spaced from the reel 56. The "Negator" spring 58 operates in known manner to provide a spring loading for the reel 50. "Negator" is a registered trademark of the Hunter Spring Co., Inc.

Therefore, whenever the coupler 32 is moved out from the encoder casing 10, the resulting rotation of the reel 50 causes the reel 56 to draw the "Negator" spring 58 from the reel 62. Then, when the slide or table coupled to the coupler 32 moves in the opposite direction, the "Negator" spring 58 automatically coils itself back on the reel 62, pulling the tape 30a back into the housing 10 and around the reel 50. In this way, the control shaft of the encoder of the second embodiment may be turned in either direction in a manner similar to the control described above in conjunction with the first embodiment.

In the second embodiment, as shown in FIGS. 4–7, the wheel 52 may be adjusted so that the readings exhibited by the electronic measuring instrument correspond precisely to the linear distances measured by the extensions of the tape 30a with respect to the encoder housing. This is accomplished by causing the wheel 52 to be readily adjustable as to roundness, so that precise calibration of the instrument may be achieved. The wheel 52, as shown in FIGS. 5–7, for example, is made up of a two-part drum with a rim 73. The drum has side flanges 72 and 72', as best shown in FIG. 7, and the inner surface of the rim 73 is shaped to fit over the outer peripheral edges of the flanges 72, 72' as best shown in FIG. 6.

The rim 73 may be composed of a material, such as neoprene, for example, with a Shore durometer hardness up to approximately 100. As shown, for example, in FIGS. 6 and 7, the side flanges 72 and 72' of the drum each has an inward taper at its peripheral edge. A series of screws 74 extend through the side flange 72 of the drum and are threaded into the side flange 72'. A series of set screws 76 extend into the void between the side flanges 72 and 72' of the drum and are threaded to the side flange 72 and abut against the side flange 72'. It will be appreciated that by adjustment of the screws 74 and of the set screws 76, the drum assembly can be distorted so that the rim 73 may take on any degree of roundness and the exact diameter required for critical calibration. By this means, the roundness and diameter of the rim can be brought to within very close tolerances.

Specifically, the rim 73 may be made perfectly round within very close tolerances by the aforesaid adjustments of the screws 74 and 76. In addition, slight distortions may be introduced into the roundesss of the rim, if necessary, in order to compensate for other distortions in the system as a whole. The apparatus may be calibrated so that when the tape 30a is extended over certain standard calibration distances, adjustments may be made to the drum by way of the screws 74 and 76, until the read-out 18a exhibits a reading corresponding exactly to the standard distances.

As shown in FIG. 4, an electrically energized heater unit 90 may be included in the lower part of the housing 10, and the heater may be energized through an adjustable thermostat 92 which can be controlled from the exterior of the housing. The lower part of the housing may be sealed so that the heater may maintain its temperature, and may maintain the temperature of the wheel assembly 52, at a predetermined constant value as set by the thermostat 92. This temperature value may, for example, be somewhat higher than the highest ambient temperature normally encountered by the instrument.

Then, the thermostat 92 is effective to control the heater and maintain the temperature of the wheel assembly at the desired level. This enables the temperature of the wheel assembly 52 and the calibration of the instrument to be maintained invariable throughout wide changes of ambient temperatures. Moreover, the thermostat control itself may be used as a fine calibration adjustment of the wheel assembly during the calibration operation. Specifically, after the aforesaid mechanical adjustments have been made to the wheel, the thermostat may be adjusted to set the temperature at a level at which exact calibration is achieved and to maintain the wheel assembly at that level.

As mentioned above, the bidirectional counter 18 may be used to control an appropriate printer, and such a printer is designated 80 in FIG. 8. FIG. 8 shows schematically the manner in which the encoder 12 controls the bidirectional counter 18 which in turn may be used to control the printer 80, or any other appropriate control, as enumerated above.

As shown in FIG. 8, the encoder 12 generates a pair of phase displaced pulse signals designated Phase A and Phase B in FIG. 8, and these pulse signals are sensed by the bidirectional counter 18 to provide a display 18a. The signals designated Phase A and Phase B are displaced 90° and, in the "Rotoswitch" encoder, as mentioned above, the resolution is such that each pulse signal exhibits two complete cycles for each full rotation of the control shaft.

The details of the "Rotoswitch" encoder are shown, for example, in FIG. 9, in which the control shaft 14 is rotatable in a housing 82 of the encoder 12, and a slotted disc 84 is mounted on the end of the control shaft 14. Then, as the control shaft 14 rotates, radial slots on the slotted disc 84 are caused to move between a lamp 86 and a light sensor 88 in the form, for example, of an appropriate photocell. A second lamp and light sensor combination is also mounted within the housing 82, and the two lamp/sensor combinations generate the two phase-displaced signals designated Phase A and Phase B in FIG. 8.

The connections of the lamps and light sensors to a typical 12-volt direct-volt exciting source are shown, for example, in the schematic circuit diagram of FIG. 10. The light sensors 86 generate the Phase A and Phase B electric signals shown in FIG. 8, as voltages referenced to a common line designated C in FIG. 10.

As shown in FIG. 11, for example, the bidirectional electronic counter and display unit to be described includes a decoder represented by the block 100 in FIG. 11, and shown in further detail in FIG. 13, a ($\pm$) count control circuit designated by the block 102 in FIG. 11 and shown in greater detail in FIG. 14, a zero gate circuit 104 shown in block form in FIG. 11, and in more detail in FIG. 12, and a counter 106 shown in block form in FIG. 11, and in further detail in FIG. 15.

The pulse signals designated Phase A and Phase B from the encoder 12 are applied to the decoder 100, and the decoder produces a train of triggering pulses T in response to the signals, the triggering pulses being applied to the counter 106, and are used to trigger the counter from one step to the next. The decoder 100 also produces a direction of rotation command D which has a first value for a first direction of rotation of the control shaft of the encoder 12, and which has a second value for a second direction of rotation of the control shaft.

The zero gate 104 is coupled to the counter 106 and produces an output ($Z = 1$) when the counter is at its zero count position. The count control 102 responds to the command signals D and Z to produce an up/down command DC for the counter 106. The counter 106 responds to the command signal DC to count up in response to the trigger signal T when the command signal DC has a first value ($DC = 1$), and to count down in response to the trigger signal T when the command signal DC has a second value ($DC = 0$).

The combination of FIG. 11 permits the counter 106 to be set to zero for a predetermined position of the measuring unit associated with the encoder 12. Then, the control of the counter by the decoder 100 and count control 102 is such that for a particular direction of rotation of the encoder 12 the counter 106 counts up as the corresponding linear distance increases from zero and counts down when the corresponding linear distance decreases towards zero, with a particular sign, and to operate in the opposite way for the inverter sign.

The zero gate 104 is shown in more detail in FIG. 12, and comprises a series of gates 110, 112, 116 and 118. These gates sense flip-flop states in the counter 106 to produce an output ($Z = 1$) whenever the counter passes through its zero count, and to produce an output ($Z = 0$) for all other counts.

The decoder 100 is shown in logic detail in FIG. 13. As illustrated, the input terminal 120 is the common terminal to which the common lead C of FIG. 10 is connected, whereas the Phase A signal from the encoder 12 is applied to the input terminal 122 and the Phase B signal from the encoder is applied to an input terminal 124. The input terminals 122 and 124 are connected to a series of gates 126, 128, 130 and 132, directly and through a pair of inverters 134 and 136, so that the terms $\overline{A}$, B are applied to the gate 126, the terms A, $\overline{B}$ are applied to the gate 128, the terms $\overline{A}$, $\overline{B}$ are applied to the gate 130, and the terms A, B are applied to the gate 132.

The gates 126 and 128 are connected to a flip-flip formed by a pair of gates 138 and 140, the output terminals of which are connected to respective gates 142, 144, 146, 148. Likewise, the gates 130 and 132 are connected through inverters 150 and 152 to the aforesaid gates 142, 144, 146 and 148, as shown. The gates 126, 128, 130 and 132 are also connected to a flip-flop formed by a pair of gates 154 and 156, the output terminals of which are connected to a further group of gates 158, 160, 162 and 164, as shown. The gates 126 and 128 are also connected through inverters 166 and 168 to the latter group of gates, as shown. The "and" gates 142, 146, 160 and 164 are all connected to a gate 166, whereas the gates 144, 148, 158 and 162 are all connected to a gate 168.

The gate 166 is connected to one input terminal of a flip-flop formed by a pair of gates 170 and 172, whereas the gate 168 is connected to the other input terminal of the flip-flop. The command D appears at the set output terminal of the flip-flip 170, 172. When that flip flop is in a first state the term D has a value ($D = 1$) to indicate that the control shaft of the encoder 12 is turning in a first direction, and when the flip-flop is in its other state, the term has a second value ($D = 0$) to indicate that the control shaft is turning in the other direction.

If it be assumed that the Phase A signal derived from the encoder 12 is a square wave which undergoes a transition $\overline{A}, \overline{A}, A, A, \overline{A}$ as the shaft turns a full revolution from 0°–90°–180°–270°– 360°; whereas the Phase B signal is a square wave which undergoes changes $\overline{B}$, B, B, $\overline{B}$, $\overline{B}$, for a similar full revolution of the control shaft. Therefore, when the control shaft is turned in a first direction from a 0° setting through one complete revolution, the two signals undergo the following changes: $\overline{A} \overline{B}, \overline{A} B, A B, A \overline{B}, \overline{A} \overline{B}$. However, for one complete revolution of the control shaft of the encoder in the oppposite direction, the outputs assume the consecutive values $\overline{A} \overline{B}, A \overline{B}, A B, \overline{A} B, \overline{A} \overline{B}$.

The decoder circuitry of FIG. 13 senses the aforesaid consecutive values of the two signals to provide the output term D indicative of the direction in which the control shaft is turning. For example, if the shaft is turning in the first direction, the occurrence of the term $\overline{A} B$ at the 90° position enables the gate 126 to set the flip-flop 138, 140. This is then followed by the term A B, and the net result is that the gate 144 is enabled, the output of which is passed by the gate to reset the flip-flop 170, 172 to provide a down command ($D = 0$) at the output terminal, indicative of that particular direction of rotation of the control shaft. Likewise, for the same direction rotation, the term A B is followed by the term A $\overline{B}$ and this is sensed by the gate 132 resetting the flip-flop 154, 156, and the output from the gate 128 cooperating with the reset output of the flip-flop 154, 156 activates the gate 162, thereby to set or maintain the flip-flop 170, 172 in its reset state ($D = 0$) by the passage of the resulting output through the gate 168.

However, should the rotation of the control shaft reverse, the term $\overline{A} \overline{B}$, for example, is now followed by the term A $\overline{B}$. For the latter rotation of the control shaft, the term $\overline{A} \overline{B}$ causes the gate 130 to set the flip-flop 154, 156, thereby to enable the gate 160, and the term A $\overline{B}$ is passed through the gate 128, and inverted in the inverter 166 to pass through the gate 160, the output of which is passed by the "or" gate 166 to set the flip-flop 170, 172. Therefore, the output term is ($D = 1$) which indicates the opposite rotation of the shaft 14 of the encoder.

In like manner, the flip-flops 138, 140, and 154, 156 are successively set and reset by the successive terms derived from the Phase A and Phase B signals by the network 126, 128, 130 and 132, and, in each instance, a term depending on the direction of rotation is passed to the networks 142, 144, 146 and 148 and 158, 160, 162, 164, so that the direction may be sensed. Whenever the direction of rotation is in the first direction, the flip-flop 170, 172 is reset and the up/down command term $D = 0$; and when the rotation is in the opposite direction, the flip-flop 170, 172 is set, so that the command $D = 1$.

The outputs from the "and" gate 126, 128, 130 and 132 are all passed through respective 150 picofarad capacitors 180 to an "or" gate 182. In each instance, the capacitor 180 is connected to a grounded 10 kilo-ohm resistor 184, as shown. The output from the "or" gate 182 is connected to an output terminal 186 at which the trigger pulse T appears, and the complement $\overline{T}$ of the trigger signal output appears at an output terminal 188.

The output terminals 186 and 188 are interconnected by a pair of inverters 190 and 192 which are connected in a time delay circuit which includes a 150 picofarad capacitor 194 and a 10 kilo-ohm resistor 196, the resistor being connected to the positive terminal of an appropriate unidirectional potential exciting source. The circuitry is such that each transition of the outputs of the "and" gates 126, 128, 130 and 132 is differentiated in the corresponding resistance-capacitor network 180, 184 to produce a pulse which is used as the trigger T and $\overline{T}$ for the counter 106 of FIG. 15.

The (±) count control circuit of FIG. 14, as mentioned above, responds to the zero sensing term Z from the zero gate 104 of FIG. 12, and to the direction of rotation term D from the decoder 100 of FIG. 13 to provide an up/down command DC for the counter 106 of FIG. 15. The term Z is applied at an input terminal 200, the term D is applied to an input terminal 202, and the term DC appears at an output terminal 204. The term $Z = 1$ when the counter is at zero, the term $D = 1$ for a first direction of rotation of the encoder 12, and the term $DC = 1$ when the count of the counter 106 is to increase, and $DC = 0$ when the count of the counter is to decrease.

The circuit of FIG. 14 also includes a sign indicator tube 206, which may be a usual Nixie tube, and which constitutes part of the display of the unit of FIG. 11. The tube 206 has a common electrode which is connected through a 10 kilo-ohm resistor 208 to the positive terminal B++ of a relatively high source of unidirectional potential. The tube 206 is driven by a pair of NPN transistors 210 and 212, the collectors of which are connected first and second electrodes of the tube 206, so that when the transistor 210 is conductive, a (−) sign is displayed, and when the transistor 212 is conductive a (+) sign is displayed. The transistors 210 and 212 may be of the type presently designated 2N4409.

The emitters of the transistors 210 and 212 are both connected by way of a common lead 214 to the input terminal 200, and the zero sensing signal Z is therefore applied to the emitters to block the transistors and cut off the Nixie tube 206 when Z = 1. A further NPN transistor 216, which may be of the same type as the transistors 210 and 212, has its emitter connected to the emitters of the transistors 210 and 212, and its collector connected to the collector of the transistor 210.

The input terminal 200, to which the term Z is applied, is also connected to an inverter 218, to an "and" gate 220, and to the said input terminal of a flip-flop composed of a pair of "and" gates 222 and 224. The set output terminal of the "and" gate 222, 224, is also connected to the "and" gate 220, and the output of the "and" gate 220 is connected through an inverter 226 to a pair of gates 228 and 230.

A direct clearing signal for the display unit may be derived from any appropriate source, and this signal is designated (Cd) and is used to set the entire display to zero for any predetermined reference position of the encoder. The (Cd) signal may be introduced to an input terminal 232, and thereby applied to the set input terminal of a flip-flop made up of a pair of gates 234 and 236. The set output terminal of the flip-flop 234, 236 is connected to a 10 kilo-ohm resistor 240 which, in turn, is connected to the base of the transistor 210. The reset output terminal of the flip-flop is connected to a 10 kilo-ohm resistor 242 which, in turn, is connected to the base of the transistor 212. The latter terminal is also connected to the junction of a pair of 10 kilo-ohm resistors 244 and 246. The resistor 244 is connected to an input terminal 245, and the resistor 246 is connected to the base of the transistor 216. A term (S) is applied to the input terminal 245.

The direction control term (D) from the decoder 100 of FIG. 13 is applied, by way of the input terminal 200 to a gate 250 and to the gate 228. This term is also inverted in an inverter 252, and the inverted term applied to the gate 230, and to a further gate 254. The output terminals of the flip-flop 234, 236, are also connected to the gates 250 and 254. The output terminals of the gates 250 and 254 are passed through a common amplifier to the output terminal 204, at which the up/down term DC appears. The amplifier 256 may be an integrated circuit of the type designated MC798P.

The sign indicator 206 may be preset by means of a single-pole double-throw switch 258 whose movable arm is connected to the positive terminal B+, and which has a pair of fixed contacts designated N and P. The switch contact N is connected to a grounded 10 kilo-ohm resistor 260, and to a set input terminal of the flip-flop 234, 236, and the fixed contact P is connected to a grounded resistor 262 and to a reset input terminal of the flip-flop 234, 236.

The inverter 218 is connected to a 150 picofarad capacitor 270 which, in turn, is connected to a grounded 10 kilo-ohm resistor 272 and to a gate 274. The output of the gate 274 is connected to a 150 picofarad capacitor 276 which, in turn, is connected to an inverter 278 and to a 10 kilo-ohm resistor 280. The resistor 280 is connected to the positive terminal B+ of the source of unidirectional potential. The output of the inverter 278 is connected to a 150 picofarad capacitor 284 which, in turn, is connected to the reset input terminal of the flip-flop 222, 224 and to a grounded 10 kilo-ohm resistor 286.

Each time the counter 106 of FIG. 1 goes through zero, the term Z = 1. Whenever that occurs, a reversal is required, in that the direction previously indicated by D = 1 must now be reversed. That is, if previously D = 1 required an up count (DC = 1), the passage through zero of the counter now requires the direction D = 1 to produce a down count (DC = 0).

This reversal is achieved by the flip-flop 222, 224. Each time the term Z = 1, the flip-flop is set, and it remains set for a brief interval, until the complement of the Z = 1, produced by the inverter 218, and delayed by the circuitry associated with the gate 274, is applied to the reset input terminal of the flip-flop to reset the flip-flop. Therefore, each time the counter passes through zero, the flip flop 222, 224 is set for a brief interval.

When the flip-flop 222, 224 is set, the gate 220 is enabled, so the the Z = 1 signal, as controlled by the gates 230, 228 is effective to change the state of the flip-flop 234, 236 from its previous state. The preset sign switch 258 is also capable of achieving that function. The setting of the flip-flop 234, 236, not only controls the sign displayed by the indicator 206 by its connected to the transistors 210 and 212, but it also controls the gates 250 and 254, so as to determine whether the input D = 1 will result in an output DC = 1, or whether the input D = 1 will result in an output DC = 0, or vice versa.

The term S is also effective in this control. This term is established to be S = 1 (B+) if D = 1 after Z = 1; and to be S = 0 (B−) if D = 0 after Z = 1. Then if S = 1, DC = D; but if S = 0, then DC = $\bar{D}$.

The counter 106 which actually controls the display readings is shown in FIG. 15. A Nixie or other equivalent display tube 300 is included in the circuit to provide the display 18a of FIG. 8. the display tube includes a common electrode which is connected, for example, through a 10 kilo-ohm resistor 302 to the positive terminal B++ of the source of unidirectional potential. The Nixie tube 300 is drivne by a series of transistors Q1–Q10 of the NPN type, and these transistors may be of the type presently designated 10–2N4409. Whenever any one of the transistors is rendered conductive, the tube 300 is caused to glow, for example, and display a corresponding decimal number in the range 0–9.

As illustrated, the collector electrodes of the transistors Q1–Q10 are connected to the various electrodes of the Nixie display tube 300, and adjacent pairs of the transistors have their base electrodes connected together. The emitters of the even numbered transistors Q2, Q4, Q6, Q8, Q10 are connected to a common lead K, and the emitters of the odd numbered transistors Q1, Q3, Q5, Q7, Q9 are connected to a common lead J. These common leads connect with the $\bar{Q}$ and Q output terminals of a drive flip-flop designated FF1.

A group of four additional flip-flops designated FF2, FF3, FF4 and FF5 are connected as a ring counter. The ring counter normally establishes five distinct counts, but the addition of the drive flip-flop FF1 effectively doubles the capacity of the counter. The drive flip-flop FF1 is successively triggered between its set and reset states by successive trigger pulses (T) derived from the decoder 100 of FIG. 13 and applied to the input terminal 304. The input terminal 304 is connected through an inverter 306 and through a 150 picofarad capacitor 308 to a gate 310.

The capacitor 308, in conjunction with a grounded 10 kilo-ohm resistor 312 forms a differentiating circuit. The action is such that the first trigger pulse applied to the drive flip-flop FF1 reverses the state of the flip-flop, and every second trigger pulse which is applied at the input to the drive flip-flop FF1 serves to advance the ring counter by one count. Therefore, if the ring counter is initially in its zero state, and the drive flip-flop FF1 is in its zero state, the display count is zero, this being achieved by the conductivity of the transistor Q1, as controlled by the drive flip-flop FF1. Then as the drive flip-flop is triggered to its set state, the display count becomes 1 due to the controlled conductivity of the transistor Q2, with the ring counter remaining at its zero count. The following pulse to the drive flip-flop FF1 resets it to zero and advances the ring counter to its first count, so that the transistor Q3 is rendered conductive, and the number 2 is displayed. This action continues with successive numbers being displayed and an effective ring of 10 counts is thereby achieved.

The drive flip-flop FF1 may be set to any desired initial setting by means, for example, of the circuitry shown by the dotted lines, and which includes a presetting switch 314. The switch 314 is connected through an appropriate flip-flop 316, 318, the outputs of which are connected through a common gate 320, and through an inverter 322, so that a trigger pulse may be applied to the drive flip-flop FF1, each time the switch 314 is changed from one position to the other.

The system and display may be reset to zero for any reference position of the encoder by the (Cd) signal applied to an input terminal 330, and which terminal is connected to reset terminals R of the flip-flops FF1–FF5.

The stages of the ring counter are interconnected by a series of half-adder networks composed, in each instance, of gates 332, 334 and 336 connected as shown. The trigger pulses for the ring counter are derived from the gate 334 at the extreme left of FIG. 15, and by means of a differentiating network formed of a 680 picofarad capacitor 340 and grounded 10 kilo-ohm resistor 342. The junction of the capacitor 340 and resistor 342 is connected to an inverter 344 which, in turn, is connected to the trigger terminals of the flip-flops FF2, FF3, FF4 and FF5. The flip-flop FF1 may be an integrated circuit of the type designated MCMM22P, and the remaining flip-flops FF2, FF3, FF4 and FF5 may each be formed of half such an integrated circuit. A pair of gates 330 and 352 intercouple the various flip-flops to the half adder circuitry, as shown.

The outputs of the drive flip-flop FF1, and of the ring counter flip-flops FF2–FF5, are compared and gated in the half-adder circuit, and this circuit determines the direction of count, that is, whether the counter is to count up or down. In the up count mode (DC = 1), the count advances from left to right in FIG. 14, and in the down mode (DC = 0), the count proceeds from right to left. The flip-flop 316, 318 is the reset flip-flop, and it determines the direction of the count. When the set-reset flip-flop 316, 318 is in the reset state, for example, its output, as applied to a gate 360 is low, and the term DC is also applied to that gate, so that when the term DC = 0, representing a down control, the output of the gate 360 is a 1. This output is inverted by an inverter 362. Therefore, in the aforesaid state of the set-reset flip-flop 316, 318, and when the term DC = 0, the bus 364 of the half-adder circuit is high and the bus 366 is low. For that condition of the buses, the half-adder circuitry causes the count of the ring counter to proceed from the right to the left in FIG. 15. When either the set-reset flip-flop 316, 318 is reversed, or the term DC = 1, the condition is reversed, so that the bus 366 becomes high and the bus 364 becomes low, under which condition, the count of the ring counter is caused to proceed from the left to the right in FIG. 15.

A carry output is generated from the zero state of the ring counter, as determined by the gates 350 and 352 which read the Q states of the flip-flops FF2–FF4. When the states are simultaneously at zero, the output of the gates 350 and 352 is such that a 1 appears on the bus 368. The bus 368 is connected to an inverter 370 which, in turn, is connected, together with the Q output terminal of the flip-flop FF1, to a gate 372. The output of the gate 372 is connected through an inverter 374, so that the carry output CY may be produced for the ring counter associated with the next ordinal level of the display.

The gates 350 and 352 are also connected through a 10 kilo-ohm resistor 378 to the base electrodes of the transistors Q1, Q2, the Q output terminal of the flip-flop FF2 is connected through a 10 kilo-ohm resistor 380 to the base electrodes of the transistors Q3 and Q4, the Q output terminal of the flip-flop FF3 is connected through a 10 kilo-ohm resistor 382 to the base electrodes of the transistors Q5 and Q6, the Q output terminal of the flip-flop FF4 is connected through a 10 kilo-ohm resistor 384 to the base electrodes of the transistors Q7 and Q8, and the Q output terminal of the output terminal FF5 is connected through a 10 kilo-ohm resistor 386 to the base electrodes of the transistors Q9 and Q10. These connections provide a return path for the transistors, when the transistors are energized, as described above.

A binary coded output may be derived, for example, at the output terminals 390, 392, 394 and 396. The $\overline{Q}$ output terminal of the flip-flop FF1 is connected to the terminal 390 to provide a $\overline{1}$ output, the Q output terminal of the flip-flop FF2 and Q output terminal of a flip-flop FF4 are connected through a gate 398 to the output terminal 392 to provide the $\overline{2}$ output, the Q output terminal of the flip-flop FF3 and the Q output terminal of the flip-flop FF4 are connected through a gate 399 to the output terminal 394 to provide the $\overline{4}$ output, and the $\overline{Q}$ output terminal of the flip-flop FF5 is connected to the output terminal 396 to provide the $\overline{8}$ output.

The invention provides, therefore, an improved simple and rugged electronic measuring instrument for the precise interpolation of linear motion into rotary motion, and for subsequently displaying the corresponding linear distances represented thereby in a bidirectional electronic counter and display unit.

What is claimed is:

1. A linear measuring instrument assembly including:
   a housing;
   an encoder mounted in said housing and including a control shaft rotatable in either direction about a particular axis, said encoder generating electrical signals indicative of the number of rotations of said control shaft and of the direction of rotation thereof;
   a wheel assembly coupled to said encoder control shaft so that rotary movement of said wheel assembly in one direction or the other causes corresponding rotary movements of said encoder control shaft, said wheel assembly being comprised of a central drum member having a pair of side flanges defining a space therebetween each with a tapered peripheral edge, an adjustable rim mounted on the peripheral edges of said flanges, a first plurality of screws extending through said side flanges and across said space and adjustable to draw said side flanges towards one another, and a second plurality of screws extending through one of said side flanges and across said space therebetween and adjustable for moving said side flanges away from one another;

an elongated control member coupled to said wheel assembly and movable linearly in and out of said housing so that linear movements of said control member are transposed to corresponding rotary movements of said wheel assembly in one direction or the other whereby linear distances measured by the extension of said control member from said housing may be transformed into equivalent numbers of rotations of said wheel assembly and said control shaft coupled thereto in one direction or the other; and an electronic bidirectional counter and read-out unit electrically coupled to said encoder and responsive to said electrical signals therefrom for obtaining readings indicative of the linear distances measured by the extension of said control member from said housing.

2. A linear measuring instrument assembly, comprising:

a housing;

a gauge wheel mounted in said housing for rotation about a particular axis, said wheel having an outer peripheral tape-engaging surface concentric with its axis of rotation;

a flexible elongated tape member trained over a portion of the outer peripheral tape-engaging surface of said gauge wheel to frictionally engage and turn said gauge wheel in one direction or the other as said tape member is moved out from or into said housing whereby linear movement of said tape member is converted into rotary movement of said wheel in one direction or the other;

tape storage reel means mounted in said housing for rotation on an axis in spaced parallel relation to the axis of rotation of said gauge wheel, said tape member being advanced for storage on said storage reel means from the outer periphery of said gauge wheel;

constant torque spring means for said storage reel means including a pair of spaced spring reels and a spring member mounted on said spring reels and extending therebetween to spring-load one of said spring reels, said one of said spring reels being coupled to said storage reel means whereby to resiliently bias said tape member into said housing under substantially constant tension and maintain a substantially constant frictional force between said tape member and said gauge wheel as said tape member is moved into and out of said housing;

photoelectric encoder means including a control shaft and slotted disc rotatable in either direction about an axis in parallel relation to the axis of rotation of said gauge wheel, said photoelectric encoder means including photocell means being operable to generate first and second electrical signals which are indicative of the number of rotations and direction of rotation of said control shaft as said slotted disc is rotated past said photocell means;

gear means mechanically coupling said gauge wheel to said control shaft so that the movement of said tape member is converted by said gauge wheel and said gear means into an equivalent number of rotations of said control shaft of one direction or another as represented by said first and second electrical signals generated by said photoelectric encoder means; and electronic bidirectional counter means connected to said photoelectric encoder means to receive said first and second electrical signals therefrom, said counter means being operable to count said first and second electrical signals either in a positive or negative direction depending on the order in which said first and second electrical signals are received and generate readings indicative of the distance measured from a predetermined zero point by said tape member by its movement out from or into said housing.

3. A linear measuring instrument assembly according to claim 2 in which said gear means includes a first gear mounted for rotation with said gauge wheel and a second gear mounted on said control shaft in engagement with said first gear, said spring means being defined by a negator spring.

4. A linear measuring instrument assembly for measuring the linear distance of movement of a movable part of a machine tool and the like, comprising:

a housing including attaching means adapted for attachment to a stationary part of the machine tool;

a gauge wheel mounted on said housing for rotation about a particular axis, said wheel having an outer peripheral tape-engaging surface concentric with its axis of rotation;

a flexible elongated tape member trained over a portion of the outer peripheral tape-engaging surface of said gauge wheel and extending outwardly through a slot in said housing including coupling means at the free end thereof externally of said housing adapted for attachment to the movable part of the machine tool whereby to frictionally engage and turn said gauge wheel in one direction or the other as said tape member is moved out from or into said housing by the movable part of the machine tool so that linear movement of said tape member is converted into rotary movement of said gauge wheel in one direction or the other;

a storage reel mounted in said housing between said gauge wheel and the slot in said housing for rotation on an axis in spaced parallel relation to the axis of rotation of said gauge wheel, said tape member being advanced for storage onto said storage reel from the outer periphery of said gauge wheel, said storage reel having constant torque spring means coupled thereto and operative to spring-load said reel means under substantially constant tension and resiliently bias said tape member into said housing under substantially constant tension and maintain a substantially constant frictional force between said tape member and said gauge wheel as said tape member is moved into and out of said housing;

photoelectric encoder means including a control shaft and slotted disc rotatable in either direction about an axis in parallel relation to the axis of rotation of said gauge wheel, said photoelectric encoder means including photocell means being operable to generate first and second electrical signals which are indicative of the number of rotations and direction of rotation of said control shaft as said slotted disc is rotated past said photocell means;

gear means mechanically coupling said gauge wheel to said control shaft including a first spur gear mounted for rotation on the axis of rotation of said gauge wheel and a second spur gear mounted on said control shaft in engagement with said first spur gear whereby movement of said tape member is converted by said gauge wheel and said gear means into an equivalent number of rotations of said control shaft as represented by said electrical signals generated by said encoder means; and electronic bidirectional counter means disposed externally of said housing and connected to said encoder means to receive said electrical signals therefrom, said counter means being operable to count said electrical signals and generate readings indicative of the distance measured from a predetermined zero point by said tape member by its movement out from or into said housing.

5. A linear measuring instrument assembly according to claim 4, said constant torque spring means being defined by a pair of spaced spring reels and a negator spring mounted on said spring reels and extending therebetween, one of said spring reels being coupled to said storage reel whereby to resiliently bias said tape member onto said storage reel so that said tape member is automatically movable into and out of said housing.

6. A linear measuring instrument assembly according to claim 5, said tape storage reel means including a central shaft and a storage reel member keyed for rotation on said central shaft, said central shaft including an axial extension with said one of said spring reels keyed for rotation on the axial extension of said shaft for said tape storage reel member.

7. A linear measuring instrument assembly according to claim 4, said gauge wheel including axially spaced side flanges, and the outer peripheral tape-engaging surface of said gauge wheel being in the form of a rim shaped to fit over the outer peripheral edges of said axially spaced flanges, an interface between said flanges and said rim such that axial movement of said flanges toward and away from each other effects distortion of said rim, and adjustment means connecting said axially spaced flanges to effect relative axial movement of said flanges to regulate the distortion of said outer rim.

* * * * *

PO-1050
(5/69)

UNITED STATES PATENT OFFICE
CERTIFICATE OF CORRECTION

Patent No. 3,780,440          Dated 25 December 1973

Inventor(s) James L. Taylor

It is certified that error appears in the above-identified patent and that said Letters Patent are hereby corrected as shown below:

In the Specification:

Column 5, line 62, cancel "by an" and substitute --by any--

Column 8, line 62, cancel "122" and substitute --124--
line 64, cancel "124" and substitute --122--

Column 10, line 22, cancel "186" and substitute --188--
line 25, cancel "188" and substitute --186--

Column 11, line 32, cancel "200" and substitute --202--
line 65, cancel "FIG. 1" and substitute --FIG. 11--

Column 12, line 19, cancel "connected" and substitute
--connection--
line 36, cancel "drive" and substitute --driven--

Column 13, line 41, cancel "MCMM22P" and substitute --MCM22P--
line 44, cancel "330" and substitute --350--

In the Drawings:

Figure 4, cancel "Heater Unit 100" and substitute --Heater Unit 90--
cancel "adjustable Thermostat 102" and substitute --Adjustable Thermostat 92--

Figure 13, cancel "$\underline{T}$" and substitute --$\overline{T}$--
cancel "$\overline{T}$" and substitute --T--

Figure 14, add --245-- to "S"

Figure 15, input where Cd accesses circuitry is --330-- not "300"
resistor shown from capacitor 340 to ground is labelled --342--
inverter shown from capacitor 340 to FF2 is labelled --344--

In the Claims:

Claim 1, line 60, cancel "movement" and substitute --movements--

Signed and sealed this 7th day of January 1975.

(SEAL)
Attest:

McCOY M. GIBSON JR.
Attesting Officer

C. MARSHALL DANN
Commissioner of Patents